(12) United States Patent
Andersen et al.

(10) Patent No.: US 6,542,259 B1
(45) Date of Patent: Apr. 1, 2003

(54) IMAGING SYSTEM WITH COLOR CORRECTED LIGHT SOURCE

(75) Inventors: Eric L. Andersen, Meridian, ID (US); Paul L. Jeran, Meridian, ID (US); Douglas G. Keithley, Boise, ID (US); Thomas M. Sternberg, Boise, ID (US); Curt N. Van Lydegraf, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/255,933

(22) Filed: Feb. 23, 1999

(51) Int. Cl.$^7$ ................................................. H04N 1/46
(52) U.S. Cl. ....................................... 358/1.9; 358/520
(58) Field of Search ..................... 358/1.9, 1.1, 527, 358/505, 507, 510, 511, 512, 515, 516, 520, 475; 382/162, 312

(56) References Cited

U.S. PATENT DOCUMENTS

| | | | |
|---|---|---|---|
| 4,841,337 A | 6/1989 | Hiratsuka et al. | 355/157 |
| 4,924,261 A | 5/1990 | Okino | 355/35 |
| 5,105,267 A | 4/1992 | Hayashi | 358/80 |
| 5,165,072 A | 11/1992 | Kurita et al. | 358/448 |
| 5,402,253 A | 3/1995 | Seki | 358/518 |
| 5,408,268 A * | 4/1995 | Shipp | 348/269 |
| 5,461,457 A * | 10/1995 | Nakamura | 355/77 |
| 5,515,136 A | 5/1996 | Nishio et al. | 355/37 |
| 5,541,476 A * | 7/1996 | Suzuki | 313/487 |
| 5,650,864 A | 7/1997 | Tseng et al. | 358/475 |
| 5,748,283 A | 5/1998 | Sunagawa et al. | 355/35 |
| 5,828,781 A | 10/1998 | Nakano | 382/167 |
| 5,877,487 A * | 3/1999 | Tani et al. | 235/469 |
| 6,101,006 A * | 8/2000 | Bryant et al. | 358/506 |
| 6,211,975 B1 * | 4/2001 | Bryant | 358/527 |
| 6,322,192 B1 * | 11/2001 | Walker | 347/19 |
| 6,340,868 B1 * | 1/2002 | Lys et al. | 315/185 |

FOREIGN PATENT DOCUMENTS

| | | | | |
|---|---|---|---|---|
| EP | 0107506A 1 | 5/1984 | | H04N/1/46 |
| EP | 0169383 A2 | 1/1986 | | H04N/1/46 |
| GB | 2217950 A | 11/1989 | | H04N/1/46 |

OTHER PUBLICATIONS

The Commission Internationale de L'Eclairage (CIE), "Recommendation ITU-R BT. 709-3, Parameter Values For The HDTV Standards For Production And International Programme Exchange, (Questions ITU-R-27/11)," dated as (1990–1994–1995–1998), pp. 1 through 28.

* cited by examiner

*Primary Examiner*—David Moore
*Assistant Examiner*—Stephen Brinich (57) ABSTRACT

An imaging system scans a color original and provides a signal with limited chromaticity for use by a print engine or a display. A light source illuminates the original with primary color intensities, for example 21% red, 72% green, and 7% blue. A sensor integrates the reflected intensities to provide a luminance signal. Matrix multiplication to convert to luminance is avoided. In a variation, illumination is provided with 6/19 red, 9/19 green, and 4/19 blue to provide a gray scale image of, for example, business graphics. Such an image has distinguishable variation for colors of equal lightness (L*).

34 Claims, 3 Drawing Sheets

IMAGING SYSTEM WITH COLOR CORRECTED LIGHT SOURCE

FIELD OF THE INVENTION

Embodiments of the present invention relate to imaging systems and particularly to cooperating light sources and detectors used in imaging systems.

BACKGROUND OF THE INVENTION

The conventional imaging system includes an image reader having a light source for illuminating an original image to be read and a detector that provides a signal in response to a portion of the illumination that is received by the detector by reflection from the original image or by transmission through the original image. The signal may be used in an imaging system to make a printed copy. In such an imaging system having an image reader and an electrostatic print engine, a sheet of media is printed by the deposition of black toner in response to the signal. When the original image includes color text and graphics, the signal (and therefore the printed media) do not accurately convey a uniform grayscale rendering of the original colors.

A color copier of the type described in U.S. Pat. No. 5,105,267 typically uses "white" light from a halogen lamp to illuminate the original image. Such a copier detects reflected light by splitting the reflected light into three beams, filtering each beam through a primary color filter, and sensing each primary color intensity using a charge coupled device (CCD) sensor to provide three color-separated signals. Each color-separated signal is converted to digital form using an analog to digital converter (ADC). The three ADC outputs are coupled to a matrix multiply circuit that provides lightness and chroma signals, for example, signals L*, a*, and b* of a conventional constant-hue color space defined by the Commission Internationale de L'Éclairage (CIE).

The foregoing approach to providing a lightness signal involves circuit complexity and expensive components. Without the present invention, smaller and less costly imaging systems with lower power consumption and faster scanning rate would not be economically feasible.

SUMMARY OF THE INVENTION

Accordingly, an imaging system in one embodiment of the present invention includes an image reader having a light source and a detector. The light source illuminates the original image with an energy per unit area of the image. The energy includes a first quantity of a first color and a second quantity of a second color. The first and the second quantities are each proportional to a respective quantity of corresponding color of a reference point. The reference point is determined with reference to human vision. The detector responds to the illumination of the image by providing an electrical signal. The signal includes indicia of the image in accordance with an analog integration of the first quantity with the second quantity.

By illuminating the original image with light energy of more than one color and in quantities that correspond to human vision, the electrical signal provides indicia of the image with improved color correctness. Media that is printed by a monochrome printer responding to the signal has improved grayscale appearance.

When the signal, in one embodiment, is provided without a matrix multiplication circuit and without multiple ADCs, circuit complexity and related expenses are avoided.

In another embodiment, integrating the light energy of one color simultaneously with the light energy of a second color avoids the complexity and cost of a buffer memory. In such an embodiment, each analog to digital conversion result can be directly processed in pipeline fashion without buffer memory for accommodating subsequent processing that refers to more than one ADC result.

In yet another embodiment of the present invention, lower circuit complexity enables economical integrated circuit fabrication for both the light source control and detector signal processing functions on a single substrate.

BRIEF DESCRIPTION OF THE DRAWINGS

Embodiments of the present invention will now be further described with reference to the drawing, wherein like designations denote like elements, and.

In each functional block diagram, a broad line and arrow represents a group of signals that together convey a binary code, the code being evident by a common feature of each signal as observed at an instant in time. A group of signals having no binary coded relationship is shown as a single line with an arrow. A single line between functional blocks represents one or more signals.

DETAILED DESCRIPTION OF THE INVENTION

An imaging system, according to various aspects of the present invention, suitably includes any group of components that interact to read an original image and to print, communicate, store, and/or display what was read in a form having limited chromaticity. For example, imaging system 100 of FIG. 1 includes image reader 101 and output subsystem 104. Imaging system 100 may be constructed of conventional mechanical and electronic components according to conventional techniques, except as described below. In operation, imaging system 100 in one embodiment reads a full-color image from a sheet of flat media and prints a monochrome copy, transmits a monochrome copy, stores a monochrome copy, and/or displays a monochrome copy of what was read.

Figure 1:
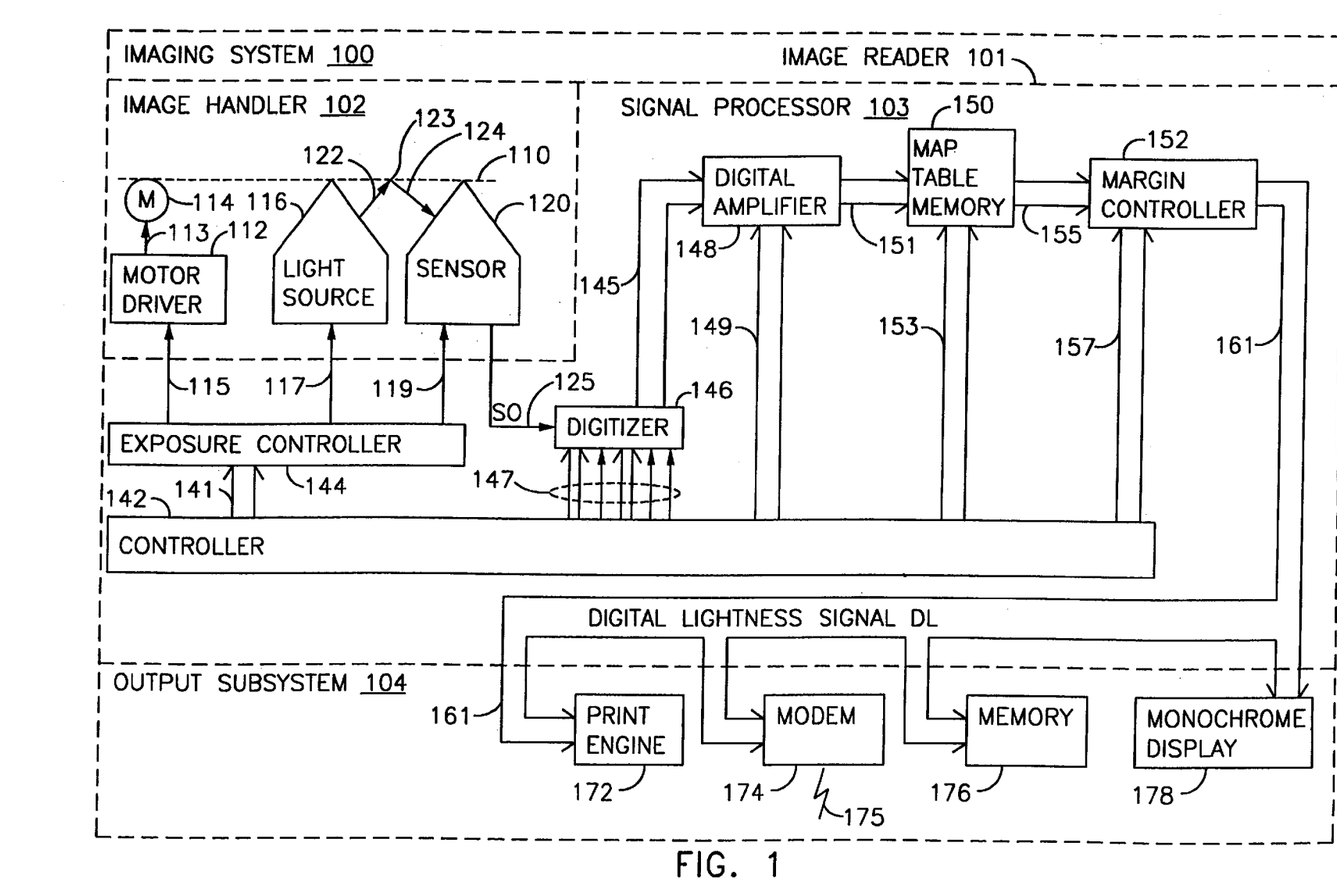
FIG. 1 is a functional block diagram of a multifunction printer in one embodiment of the present invention.

An image reader, according to various aspects of the present invention, includes any group of components that cooperate as a transducer to read an original image and to provide an electrical signal that conveys indicia of the image in a form having limited chromaticity. For example, image reader 101 includes image handler 102 and signal processor 103. Image handler 102 provides a sensor output signal SO on line 125 to signal processor 103. Signal processor 103 controls operation of image handler 102 and provides, in response to signal SO on line 125, digital lightness signal DL on line 161 to output subsystem 104. In operation, image reader 101 in one embodiment reads an original image from media on paper path 110 and provides to output subsystem 104 the signal DL that conveys indicia of the image in a multiplicity of grayscale values. Each picture element (pixel) of the original image is represented by a grayscale value. In a preferred embodiment, a grayscale value includes a magnitude (e.g., expressed as a binary number) that increases linearly with respect to the perception of lightness in human vision.

An image handler, according to various aspects of the present invention, suitably includes any group of components that cooperate as a transducer to read an original image and to provide an electrical signal as a result of an analog integration of light energy from the image. For example, image handler 102 includes motor driver 112, motor 114, light source 116, and sensor 120. Motor 114 is positioned to move media (not shown) to be read along paper path 110. Light source 116 and sensor 120 are arranged in fixed relation to project light beam 122 toward the media on paper path 110 and to direct a reflected beam 124 into sensor 120. Light beam 122 illuminates only a thin linear region 123 (extending out of the plane of FIG. 1) across the media and perpendicular to paper path 110. This region 123 may include one or more lines of pixels.

Media may be illuminated for the purpose of sensing light reflected from the original image and/or light transmitted through the original image. For example, image handler 102 is constructed to provide beam 122 at an angle of approximately 45 degrees to paper path 110 at the point of illumination 123. In like manner, sensor 120 is arranged to receive beam 124 at an angle of reflection of about 45 degrees, by Snell's Law.

Paper path 110 is shown as a straight line, however any path may be used to economically package image handler 102. For sensor accuracy, that portion of the paper path surrounding region 123 is shielded in any conventional manner from interference by ambient light.

Motor 114 includes any conventional electromechanical device for moving media on paper path 110. For example, motor 114 may be a stepper motor, a linear motor, or any electromagnetic device. Motor 114 responds to conventional signals on line 113 provided by any conventional motor controller 112.

A light source, according to various aspects of the present invention, provides color corrected light energy for illuminating the original image. Light energy that conforms to a predetermined spectral power distribution is said to be color corrected. One or more light emitters may be used for achieving the predetermined spectral power distribution, as, for example, using several of the same light emitters, and/or using light emitters that provide different portions of the predetermined spectral power distribution. Each light emitter may be used with one or more filters for obtaining all or part of the predetermined spectral power distribution from that emitter. For example, a filter may be used for intensity attenuation, wavelength selection, or a combination of both attenuation and selection.

When more than one light emitter is used to form light source 116, the individual emitters may be activated and inactivated any number of times with the result of separated, partially overlapping, or fully overlapping periods of activation in any combination selected for simplicity of system design, low circuit complexity, simplicity of operation, and/or reliability.

A sensor, according to various aspects of the present invention, includes any circuit that performs an analog integration of light energy and provides a sensor output signal as a result of such integration. A sensor output signal conveys indicia of an image and may be provided with any conventional form for conveying information. Such a sensor may include one or more lenses and/or filters to improve the signal to noise ratio for particular sensing operations, according to conventional techniques. Preferably, sensor 120 includes a conventional self-focusing lens. Any conventional circuit may be used, including circuits of the type known as a contact image sensor (CIS) and/or a charge coupled device (CCD). For example, sensor 120 includes for each pixel a conventional photointegrating circuit having a photo diode or phototransistor coupled to a capacitor. The capacitor may be a device and/or a distributed structure having capacitance. In operation, a photocurrent having a magnitude responsive to received light energy is integrated over time to provide a charge on the capacitor and a resulting voltage thereon. The voltage thus obtained for each pixel is read by a conventional analog shift register circuit. Sensor 120 responds to control signals on line 119 for a reset operation and a transfer operation. During a reset operation, charge previously acquired on one or more capacitors is discharged. Reset may be performed for all pixels simultaneously or automatically during a transfer operation. During a transfer operation, a clock signal controls the provision by sensor 120 of an analog signal for each pixel. The analog signals may be provided in a conventional time multiplexed serial manner. Each respective analog signal may correspond to the voltage on the capacitor as a result of analog integration. For a particular pixel, analog integration may be continuous (as when multiple wavelengths are provided simultaneously by light source 116) or discontinuous (as when portions of the spectral power distribution are provided at different times).

In operation of image handler 102, image handler 102 receives exposure control signals as discussed above on lines 115, 117, and 119 and provides signal SO on line 125. Motor 114 moves the provided media in any conventional manner in response to control signals on line 113 formed by motor driver 112 in response to control signals received from signal processor 103 on line 115. Light source 116 illuminates an image on the media according to a predetermined spectral power distribution in response to control signals received from signal processor 103 on line 117. Sensor 120 receives a portion of the reflected illumination from the image, accomplishes an analog integration in response to the reflected illumination, and provides the sensor output signal SO on line 125 in response to a clock signal received from signal processor 103 on line 119. Signal SO includes an analog voltage for each pixel in time division multiplex fashion as synchronized by the clock signal.

In variations, any conventional image handling method is used to effect sensing of pixels of the original image. Media received by image handler 102 on paper path 110 may be any three dimentional object or in sheet and/or roll form. When sensor 120 includes a sensing element for each pixel, light source 116 may scan pixels in any manner or illuminate all pixels simultaneously. When scanning is implemented, light source 116 may be moved in relation to the original image or vice versa, or both may be moved at different directions or rates. When sensor 120 has fewer sensing elements than the desired number of pixels in the original image, then scanning may also include movement of sensor 120 in relation to light source 116, the original image, or both.

Any portion of the media may provide an original image resulting in a sensor output signal that conveys indicia of the image. Such indicia may include analog values each describing a respective pixel and may be conveyed as voltage, current, pulse position, or frequency, to name a few conventional techniques. Signal SO may also convey reference information regarding position of the image on the original, reference analog measurements, timing information and/or self clocking codes, to name a few conventional techniques.

A signal processor, according to various aspects of the present invention, controls an image handler, receives a sensor output signal from the image handler, and provides an electrical signal that conveys indicia of the image read by the image handler, the indicia being in a form having limited chromaticity. For example, signal processor 103 includes controller 142, exposure controller 144, digitizer 146, digital amplifier 148, map table memory circuit 150, and margin controller 152. Controller 142 provides various control signals using conventional interface technique to each above listed functional portion of signal processor 103.

A controller, according to various aspects of the present invention includes any circuit that generates a sequence of control signals such as a state machine (where the sequence may be hardwired and/or in programmable memory), a sequencer, a microcoded arithmetic processor, a microcontroller, and/or a microprocessor. For example, controller 142 includes a clock and a state machine. A variation employs a microprocessor circuit, RAM, ROM, special purpose I/O circuits, and a bus for data transfer among these functional portions. In operation, controller 142 responds to input devices (not shown) and provides status displays (not shown) in a conventional manner. For example, the introduction of media into image handler 102 may activate controller 142 to produce a sequence of control signals to complete the reading of one or more images and the printing, communicating, storing, or display of one or more copies of the image(s) read.

An exposure controller, according to various aspects of the present invention, includes any circuit that controls media position and media illumination so that an image on the media is read by a sensor as described above. For example, exposure controller 144, in one embodiment, provides three types of signals. First, controller 144 provides signals on line 115 to motor driver 112 including start and stop commands to move media at a constant speed across point 123. In a variation (not shown), exposure controller 144 also responds to conventional media sensors and provides status and error signals to controller 142. Second, exposure controller 144 provides control signals to light source 116 on line 117 to control the generation of illumination according to a predetermined spectral power distribution as discussed above. In a variation, exposure controller may receive status signals from light source 116 and provide signals to controller 142 to enable error reporting by controller 142 and/or closed loop control of illumination. Third, controller 144 provides control signals to sensor 120 on line 119 for systematic reporting of illumination from sensor 120. Such control signals on line 119 may include a clock signal, and start or sync signals from which the corresponding location of reported pixels of the image can be deduced for decoding signal SO on line 125 in a conventional manner.

In a variation, exposure controller 144 is packaged with image handler 102 to meet physical and/or electrical constraints on the interface between image handler 102 and exposure controller 144.

A digitizer, according to various aspects of the present invention, includes any circuit that provides a digital signal in response to a sample of an input signal. For example, digitizer 146 responds to control signals 147 from controller 142 for scaling signal SO on line 125, sampling the scaled result, and finally providing a digital signal as a plurality of digital words in parallel binary format on line 145 in time division multiplex form. In operation, each portion of signal SO on line 125 corresponding to a next pixel of the image is converted to one digital word. Because an illuminated line may contain several hundred pixels, digitizer 146 works in cooperation with the timing of signal SO to provide, in time division multiplex form, a plurality of digital words for each line. As discussed above, controller 142 manages the timing of all image reader 101 functional blocks, specifically according to a predetermined number of pixels per line and lines per image (e.g., page).

A digital amplifier, according to various aspects of the present invention, includes any circuit that provides a digital output signal as a scaled value of a digital input signal. For example, digital amplifier 148 receives signal 145 from digitizer 146 and provides a scaled signal on line 151. Digital amplifier 148 is programmable by controller 142 and so receives programming information via signals on line 149 from controller 142. The scaling function of digital amplifier 148 may include any linear or nonlinear algebraic expression. In a preferred embodiment, digital amplifier 148 accomplishes gain and offset normalization for each pixel sensor of sensor 120. For example, when sensor 120 includes 980 pixel sensors for one scan line, and these sensors have nonuniform characteristics, a linear expression of the form $OUT_N = a_n(IN) + b_n$ is performed by digital amplifier 148 on each of the "n" pixels. In such an embodiment, digital amplifier 148 may include a state machine for timing control, a multiplier, an adder, and various registers for holding temporary values. The values for $a_n$ and $b_n$ may be provided as needed by controller 142 on line 149 or may be retrieved by digital amplifier 148 from a memory of digital amplifier 148. Such a memory may be nonprogrammable, or in a variation may be programmable, for example, by controller 142 via line 149.

A map table memory circuit, according to various aspects of the present invention, includes any circuit that provides one or more table look-up conversions in response to input digital values. Any linear or nonlinear conversion may be accomplished, including conversions based on transcendental functions or piecewise linear approximations. In a preferred embodiment, map table memory provides two conversions. First, signals on line 151 from digital amplifier 148 may include indicia of the luminance of each image read. A conversion from luminance to lightness (as described below with reference to equations 1 and 2) generally involves a cube root which is economical to implement by table look-up. Second, gamma correction for each different output device of output subsystem 104 may involve a different power function of the indicia of lightness of images read. A circuit that performs one or more such conversions generally includes any memory organized for random access, such as RAM, SRAM, DRAM, PROM, and/or EEPROM.

In a preferred embodiment, the first conversion is accomplished by applying signals on line 151 as an address to an SRAM and obtaining the result of table look-up from the data output of the SRAM. The second conversion is accomplished by addressing a second memory organized for random access in response to a composite address signal. The data output of such a memory provides signals on line 155 from map table memory circuit 150. The composite address signal includes signals on line 153 as high order address bits and signals resulting from the first conversion as low order address bits. Data stored in memory for the second conversion is organized as a two dimensional array where the first dimension selects a gamma correction table suitable for use with one or more output devices of output subsystem 104. The second dimension accomplishes the conversion of indicia of image lightness to gamma corrected indicia of image lightness.

Note that signals on line 155 from map table memory circuit 150 may be linear with human visual perception, for example, as may be suitable for direct input to a print engine, a modem, and/or a memory of output subsystem 104; or, may be nonlinear for direct input to a modem, memory, and/or monochrome display so that the image resulting after the nonlinearities of the intended output device is linear with human visual perception.

A margin controller, according to various aspects of the present invention, includes any circuit for selecting pixels according to a desired scaling and/or cropping to be applied prior to operation of an output device. For example, margin controller 152 includes a logic circuit that receives signals on line 157 that define the desired number of pixels per line and the desired number of lines per image. When signals on line 155 do not indicate the number of pixels per line as read or the number of lines per image as read, signals on line 157 may further include suitable definitions. Margin controller 152 maintains a count of pixels per line and lines per image and selectively discards indicia of the image that define pixels in regions to be cropped or in accordance with a scaling rule (e.g., discard 1 of every 4 to accomplish a reduction of 25% horizontally and/or vertically). All other indicia provided on line 155 are passed through to line 161.

In operation, signal processor 103 initiates scanning of an image at a predetermined exposure by controlling image handler 102 to provide indicia of a predetermined number of pixels via signal SO on line 125. Each pixel is converted to a digital representation (i.e. a binary number) by digitizer 146. Each digitized pixel value is then subject to a linear algebraic adjustment for gain and offset by digital amplifier 148. Then, each pixel is subject to nonlinear correction for lightness and gamma by map table memory circuit 150. Finally, selected pixels are provided on line 161 for use by output system 104. Signal processor 103 directs light source 116 to provide illumination according to a predetermined spectral power distribution, as discussed above. For a given pixel, the intensities of two or more spectral components in the predetermined spectral power distribution are combined by analog integration in sensor 120. When illuminated by primary color components of preferred intensities, signal SO on line 125 may convey indicia of the luminance of each pixel. Map table memory circuit 150 converts luminance to lightness and may apply a gamma correction, if desired. Consequently, signal DL on line 161 provides indicia of an image corresponding to lightness (whether or not gamma corrected) in a digital form.

In a variation, illumination is provided to distinguish portions of an image that exhibit a noticably wider range of chromaticity than the range of lightness. Such portions often occur in business graphics where, for example, colors in a pie chart have indistinguishable differences in lightness but are of different colors. Such illumination includes any non-lightness based spectral power distribution. A non-lightness based spectral power distribution includes any spectral power distribution having a range of chromaticity that spans at least two noticably different colors. For example, an illumination provided by two or more light sources may be considered non-lightness based when its use allows discrimination by a human observer of substantially equally saturated primary colors (e.g., red, green, blue, cyan, magenta, or yellow). In a variation preferred for business graphics, RGB primary illumination is provided from three LED time-multiplexed light sources with from 10% to 40% of the total light energy as red, 5% to 30% of the total light energy as blue, and the remaining percentage as green. For example, an illumination that is about 6/19 red, 9/19 green, and 4/19 blue provides good results.

Imaging system 100 may provide attractive monochrome rendering of images by operation of signal processor 103.

For example, controller 142 may respond to user input directing image processing according to a selected one of possibly several alternative non-lightness based spectral power distributions. Controller 142, exposure controller 144, and light source 116 then cooperate to illuminate the image according to the selected spectral power distribution. Controller 142 may direct map table memory circuit 150 to pass all pixels without applying table look-up conversion or may direct any suitable nonlinear corrections including a gamma correction for the non-lightness based indicia of the image read. Signals on line 161, in this case, would not include digital lightness signal DL, but rather would include a digital grayscale signal not based on lightness.

Signal processor 103 may meet desired performance criteria of imaging system 100 in one or more of several other variations. For example, digitizer 146 may include amplification for the application of offset and gain correction to be applied to all pixels-conveyed by signal SO on line 125. Digital amplifier 148 may include conventional circuitry for digital filtering to obtain effects such as edge enhancement and/or contrast improvement. Map table memory circuit 150 may include conventional circuitry for digital filtering in horizontal and/or vertical directions with additional memory for retaining intermediate pixel values prior to and/or following table look-up functions. Margin controller 152 may be eliminated when exposure control accomplishes sufficient scaling and cropping of the image being read. For production economies, signal processor 103 may be fabricated on an integrated circuit substrate with or without any portion of image handler 102.

The digital signal provided by an image reader of the present invention may be used to provide media printed in response to the digital signal, data communication in response to the digital signal, storage of data in response to the digital signal, and/or image display in response to the digital signal. An output subsystem, according to various aspects of the present invention includes any apparatus for presenting an image read. For example, imaging system 100 includes output subsystem 104 that responds to signal DL on line 161 to provide image printing, communication, storage, and/or display. Output subsystem 104 includes print engine 172, modem 174, memory 176, and/or monochrome display 178.

A print engine includes any electromechanical system that responds to a digital signal for printing on media, for example, an exposure system for photographic film, an electrostatic printer, a laser printer, or an ink jet printer. Print engine 172 responds to digital signal DL on line 161 for printing the image read. Print engine 172 may include any conventional interface for receiving digital signal 161 from image reader 101 and any conventional formatter for providing a halftone or contone representation of it.

A modem includes any interface for data exchange via an intranet or internet. For example, modem 174 responds to digital signal DL on line 161 to provide conventional facsimile communication 175 via telephone or dedicated link. In variations, modem 174 may couple imaging system 100 to a remotely located output subsystem, or to a computing system for image analysis, such as a document identification system.

A memory includes any apparatus for data storage in response to a digital signal. For example, memory 176 responds to digital signal DL on line 161 to store idicia of the image read. Memory 176 may include semiconductor memory circuits, magnetic memory drives, and/or optical memory drives or devices. In variations, memory 176 includes memory organized as FIFO or buffer memory for frame storage. Memory 176 may cooperate with other portions of output subsystem 104 to provide buffered output.

A display includes any apparatus that provides a visual presentation of an image in response to a digital signal. For example, display 178 responds to digital signal DL on line 161 to provide a presentation of the image for human viewing. Display 178 may include a conventional monochrome display such as a CRT monitor, an LED or LCD flat panel display, a field emission display, and/or a flourescent display. In variations, display 178 may be nonresponsive to chromaticity (e.g., a CRT with a single color phosphor) or responsive to limited chromaticity (e.g., a full color display operated to view images in a limited chromaticity form).

Many variations of output subsystem 104 may be used in alternate imaging systems according to various aspects of the present invention. For example, in a first variation, output subsystem 104 is omitted. In other variations, one or more of the illustrated functional units may cooperate in series or in parallel with each other.

Figure 2:
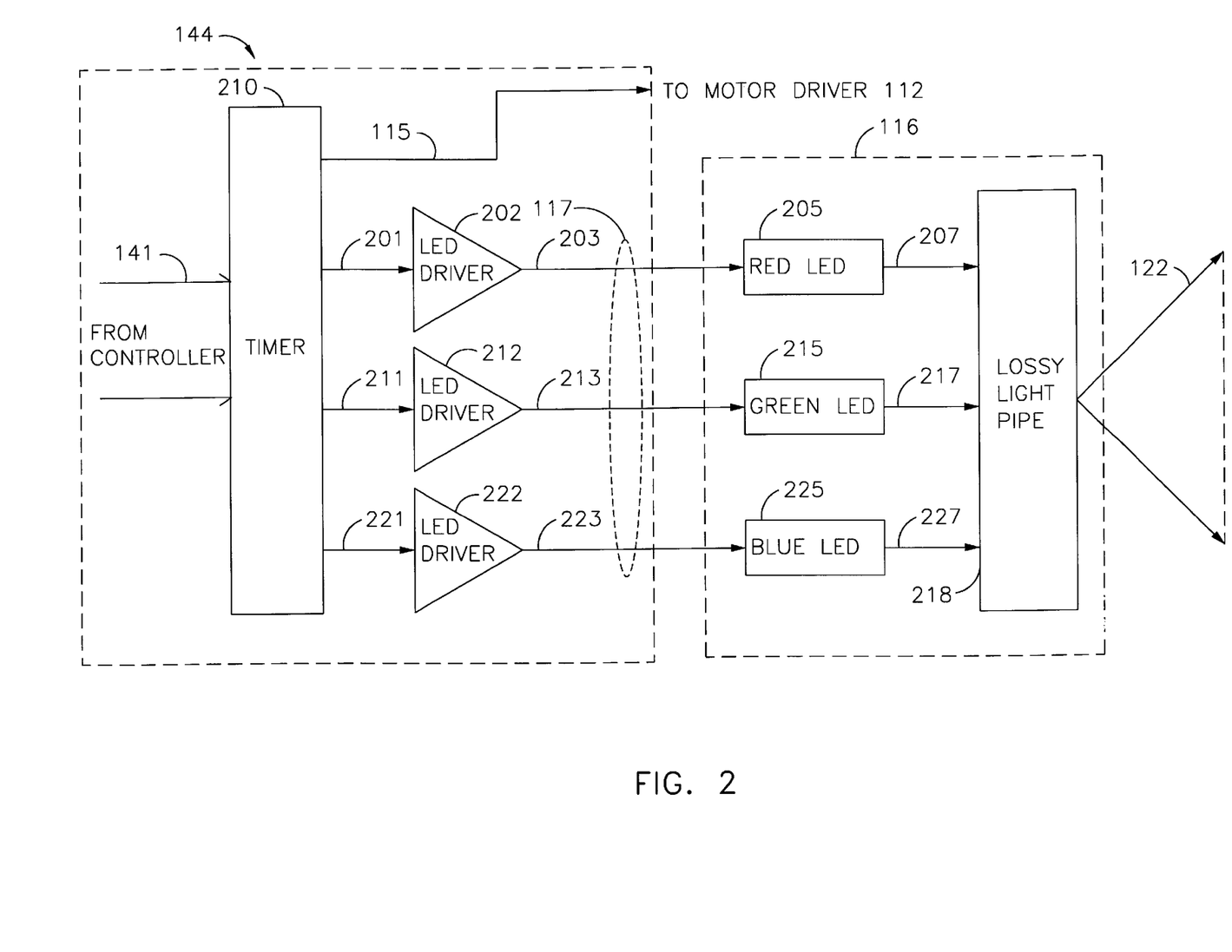
FIG. 2 is a functional block diagram of the exposure controller of FIG. 1.

The cooperation of an exposure controller and light source according to various aspects of the present invention may be better understood with reference to an exemplary exposure controller and light source as shown in FIG. 2. Exposure controller 144 of FIG. 2 includes timer 210, and LED drivers 202, 212, and 222. Timer 210 responds to control signals 141 from controller 142 to provide control signals on line 115 to motor driver 112, as discussed above. Timer 210 also provides control signals 201, 211, and 221 to LED drivers 202, 212, and 222 respectively. Light source 116 of FIG. 2 includes red LED 205, green LED 215, blue LED 225, and, lossy light pipe 218. Red LED 205 provides red light in response to a signal on line 203 provided by LED driver 202. Green LED 215 provides green light in response to a signal on line 213 provided by LED driver 212. Blue LED 225 provides blue light in response to a signal on line 223 provided by LED driver 222. Lossy light pipe 218 receives red light 207, green light 217, and blue light 227 as emitted by corresponding LEDs 205, 215, and 225. Lossy light pipe 218 provides light beam 122 for illuminating region 123 of the image to be read, as discussed above.

A timer, according to various aspects of the present invention, includes any conventional circuit for providing motor control signals and LED control signals. Such signals-may be provided continuously and may be subject to simultaneous changes or sequential changes. For example, timer 210 may receive a clock signal from controller 142 and may use that clock signal (or an internal timing signal) for producing varying length pulses in a conventional manner. The duration of each pulse may be dictated by commands received by timer 210 from controller 142 via signals on line 141.

In a preferred embodiment, when motor 112 is a stepper motor, timer 210 provides pulses on stator windings to accelerate motor 114 up to a predetermined speed and to maintain motor 114 at the predetermined speed during scanning. When illumination for a single scan line is needed, timer 210 simultaneously activates LEDs 205, 215, and 225 and then sequentially deactivates these LEDs to provide an illumination in a spectral power distribution of, for example, about 21% red, 72% green, and 7% blue from LEDs 205, 215, and 225 respectively. When each respective LED driver is adjusted to account for the efficiency of the respective LED, for example, timer 210 deactivates in sequence blue LED 225, then red LED 205, then green LED 21. In a variation two different colors are used with green corresponding to from 70% to 80% of the total light energy.

In a variation, sequential activation of LEDs with simultaneous deactivation is used. In another variation, LED drivers 202, 212, and 222 are identical and differences in LED efficiency are accommodated by adjusting respective pulse widths. In yet another variation, LED drivers 202, 212, and 222 account for the predetermined spectral power distribution; and, pulse widths on lines 201, 211, and 221 are identical, to produce a resulting illumination that is equivalent to the illumination as discussed above.

Each LED driver 202, 212, and 222 responds to an independent output of timer 210. In a preferred embodiment, each LED driver responds to a logic level signal on its input and provides an LED operating current on its output. The operating current in a preferred embodiment corresponds to the maximum operating efficiency of the respective LED. In variations, any operating current may be used with corresponding adjustment to timing signals to achieve a desired illumination. For example, in cooperation with a sensor having buffered sensing capability, illumination may be continuous (at prescribed intensities) while motor drive signals are being provided. Alternately, illumination may be discontinued between scan lines to allow time for the sensor to transfer results and prepare for sensing the next scan line.

Any conventional light emitting diode may be used for LEDs 205, 215, and 225. In a variation, multiple LEDs of the same chromaticity are used for one or more of LEDs 205, 215, and/or 225. Using multiple LEDs of the same chromaticity may reduce the complexity or costs associated with timer 210, the respective LED driver, and/or lossy light pipe 218.

A lossy light pipe, according to aspects of the present invention, includes any structure for distributing light from a point source so that such light generally illuminates a line of predetermined length. For example, lossy light pipe 218 is a glass, generally cylindrical, light pipe that accepts light beams 207, 217, and 227 oriented into one end along the pipe's longitudinal axis and provides, perpendicular to that axis, an even longitudinally distributed beam. When multiple LEDs 205, 215, and 225 are activated, beam 122 simultaneously includes spectral components of each LED in the same manner as if activated individually.

The chromaticity (i.e., the color content) of an image is conventionally described with reference to a color space having a reference point. A typical reference point may be a white point when the reference color includes a broad spectrum of visible light. For example, the Commission Internationale de L'Éclairage (CIE) defined a color space in which each color is identified by a tuple of three components X, Y, and Z. The magnitude of each of the XYZ components is proportional to physical light energy, but their spectral composition corresponds to the color matching characteristics of human vision as empirically defined by studies of the type conducted by Munsell and as adopted by the CIE as characteristics of a Standard Observer. The luminous efficiency of the Standard Observer is defined as a positive magnitude for each light energy wavelength. As applied to a particular spectral power distribution, the Y component represents luminance as the integral of a product of the luminous efficiency of the Standard Observer and the particular spectral power distribution. Luminance, as so defined, is proportional to physical power, e.g. watts per square meter of radiating or reflective surface. To represent the approximately logarithmic perceptual response of the Standard Observer to differences between spectral power distributions (e.g., illuminated color patches), the CIE defines lightness (L*) as a modified cube root of luminance:

$$L^* = 116\left(\frac{Y}{Y_n}\right)^{\frac{1}{3}} - 16; \quad \text{where } \left(\frac{Y}{Y_n}\right) > 0.00856 \quad (1)$$

$$L^* = 903.3\left(\frac{Y}{Y_n}\right); \quad \text{elsewhere} \quad (2)$$

The value $Y_n$ is the luminance of the white point of the color space. By normalizing Y with $Y_n$, the white point of the XYZ color space is represented by the tuple (1,1,1). Lightness has a range of 0 to 100 and is linear with the perception of the Standard Observer. For example, the Standard Observer has a just noticeable difference in visibility of $L^*=1$. As an important consequence of these definitions, lightness is devoid of chromaticity information. The slightest lightness difference between two color patches that is perceptible to the Standard Observer has a ratio of respective lightness values equal to 1 regardless of the color of each color patch. Chromaticity information is defined by the components X and Z. Although perceptual uniformity is achieved for $L^*$ (i.e., for example, the perceptual difference between $L^*=15$ and $L^*=16$ is the same as the perceptual difference between $L^*=85$ and $L^*=86$), no standard is available for perceptual uniformity for chromaticity.

Several other color spaces have been defined, each in terms of a set of three primary colors. When, for example, a halogen lamp is used as a light source, primary color components of the illumination are conventionally separated by three filters, one for each primary color. To account for differences between the halogen lamp color and the color space white point, the measured primary color intensities (designated $R_h$, $G_h$, and $B_h$ for red, green, and blue respectively) may be converted by a matrix multiplication operation to a standard color space having standard wavelengths for the primary colors. For example, conversion of reflected light from such a halogen source to the color space defined in ITU-R Recommendation BT.709-3, *Parameter Values for the HDTV Standards for Production and International Programme Exchange* (1998), incorporated herein by this reference, would take the form:

$$\begin{bmatrix} R_{709} \\ G_{709} \\ B_{709} \end{bmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} R_h \\ G_h \\ B_h \end{bmatrix} \quad (3)$$

where the coefficients $a_{11}$ through $a_{33}$ are determined by analysis, measurement, or test.

Obtaining a lightness value from the above intermediate $R_{709}$, $G_{709}$, $B_{709}$ values may be accomplished with a second matrix multiplication as follows:

$$Y_{709} = [0.2125 \quad 0.7154 \quad 0.0721] \cdot \begin{bmatrix} R_{709} \\ G_{709} \\ B_{709} \end{bmatrix} \quad (4)$$

Conversion to a lightness value may follow using Equations 1 and 2. for $L^*$ with the value $Y_{709}$ for the component Y. The white point of the color space defined in Recommendation BT.709 cited above corresponds to the popular standard for daylight known as $D_{65}$. The primary colors in that color space were selected to match standard phosphors used for CRT television monitors.

In an imaging system in one embodiment of the present invention, the spectral power distribution of the light source includes primary colors for a predetermined color space defined in accordance with human vision. The intensities of the primary colors of the light source are provided in accordance with a conversion from a primary color space to a color space defined in accordance with human vision. For example, in an embodiment of the type shown in FIG. 1, light source 116 includes primary colors $R_{709}$, $G_{709}$, $B_{709}$ as defined in the BT.709 color space. The intensities are set in accordance with the conversion factors in Equation 4. with the result that signal SO on line 125 provides indicia of the image in a form having limited chromaticity (specifically, a luminance, devoid of chromaticity information) in accordance with the CIE XYZ color space. Signal processor 103 is less complex than a corresponding signal processor in a conventional imaging system. Signal processor 103 receives indicia of the image in chromaticity limited form (analog $Y_{709}$ values), so no matrix multiplication is necessary for the provision of a digital signal (signal DL on line 161) in a form having limited chromaticity.

Figure 3:
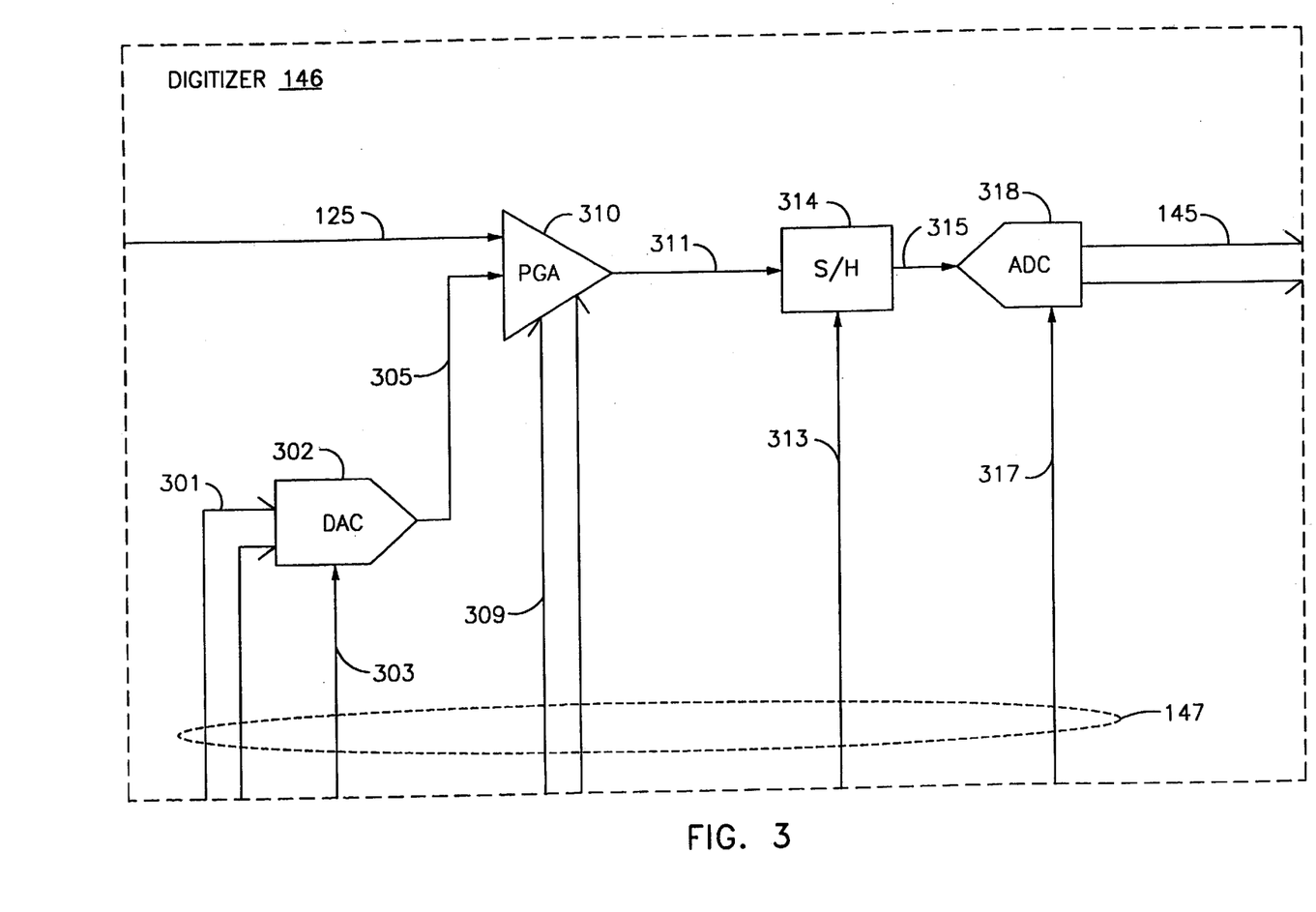
FIG. 3 is a functional block diagram of the digitizer of FIG. 1.

A digitizer, according to various aspects of the present invention, may be better understood with reference to an exemplary digitizer as shown in FIG. 3. Digitizer 146, of FIG. 3, includes digital to analog converter (DAC) 302, programmable gain amplifier (PGA) 310, sample/hold circuit 314, and analog to digital converter (ADC) 318. These components are constructed of conventional circuits arranged to operate as discussed below. These components respond to control signals 301, 303, 309, 313, and 317 which collectively are control signals 147 as shown on FIG. 1 and are provided by controller 142.

A programmable gain amplifier includes any voltage, current, or power amplifier having an input for identifying a desired gain. For example, PGA 310 includes an input for gain setting signals on line 309. In operation, PGA 310 receives signal SO on line 125 and amplifies a difference between signal SO and the output of DAC 302 on line 305. DAC 302 thereby provides a programmable offset adjustment. PGA 310 receives gain setting signals on line 309 and amplifies the difference discussed above in accordance with the gain identified by the gain setting signals. PGA 310 provides an amplified signal on line 311.

A digital to analog converter includes any programmable voltage or current source that provides a signal having an analog magnitude in accordance with a received digital signal. For example, DAC 302 receives a digital signal on line 301 that represents a binary value. DAC 302 provides a voltage on line 305 that increases linearly with the received binary value. DAC 302 performs a conventional digital to analog conversion in response to timing and control signals provided to DAC 302 on line 303.

A sample/hold circuit includes any circuit that provides an output analog signal for reference at a time after a magnitude of a corresponding input analog signal is no longer present. For example, sample/hold circuit 314 receives an analog signal on line 311, samples the voltage magnitude of the received signal as directed by control signal 313, and maintains an analog output signal on line 315 that corresponds to the sample. Each sample is held for conversion to digital form by ADC 318.

An analog to digital converter includes any circuit that provides a digital signal corresponding to the magnitude of a received analog signal. For example, ADC 318 provides a parallel digital signal on line 145 that conveys a binary coded magnitude. The binary coded magnitude corresponds to the voltage magnitude being maintained by sample/hold circuit 314 on line 315. Conversion by ADC 318 is controlled by signals received on line 317.

In operation of digitizer 146, the linear programmable gain and offset adjustment provided by controller 142 provides a transfer function similar to the transfer function of digital amplifier 148 as discussed above. In a first variation, the combined effect of both transfer functions may be accomplished in a digitizer and the digital amplifier may be omitted. In a second variation, the combined effect of both transfer functions may be accomplished in the digital amplifier with simpler digitizer. The simpler digitizer omits the DAC and PGA as discussed above. In a preferred variation, the gain and offset adjustment accomplished by PGA 310 accounts for line-to-line variation of sensor 120; and, the pixel-to-pixel variation is accounted for by the gain and offset adjustment accomplished by digital amplifier 148.

The cooperation of exposure controller 144, light source 116, sensor 120, digitizer 146, digital amplifier 148 and map table memory circuit 150 provide a signal on line 155 with limited chromaticity. When image reader 101 is to provide monochromatic indicia of a natural color image read, light source 116 may illuminate the image with two or more primary colors according to a spectral power distribution determined with reference to human vision. When image reader 101 is to provide monochromatic indicia of a color image prepared with colors of similar lightness, light source 116 may illuminate the image with two or more colors selected to distinguish such similar colors.

While the present invention has been described with reference to several preferred embodiments, variations within the scope of the claims may become apparent in light of the drawing and description above. The present invention is intended to be defined only by the recited limitations of the claims, and equivalents thereof, rather than by the drawing and description of preferred or exemplary embodiments.

What is claimed is:

1. An imaging system comprising an image reader comprising:
   a. a light source for illuminating a provided image, the illumination comprising an energy per unit area of the image, the energy comprising a first quantity of a first color and a second quantity of a second color, wherein the first and the second quantities are each proportional to a respective quantity of corresponding color of a reference point, the reference point determined with reference to human vision; and
   b. a detector of illumination of the image, the detector providing an electrical signal comprising a monochrome indicia of the image in accordance with an analog integration of the first quantity with the second quantity.

2. The system of claim 1 wherein the first color consists of a primary color.

3. The system of claim 1 wherein the first quantity comprises from 70% to 80% of the energy.

4. The system of claim 1 wherein:
   a. the first and second colors respectively comprises red and blue light;
   b. the first quantity includes from 10% to 40% of the energy; and
   c. the second quantity includes from 5% to 30% of the energy.

5. The system of claim 1 wherein:
   a. the energy further comprises a third quantity of a third color; and
   b. the first, the second, and the third quantities are each proportional to a respective quantity of corresponding primary color of the reference point; and
   c. the detector provides the electrical signal comprising indicia of the image in further accordance with an analog integration of the first quantity with the second quantity with the third quantity.

6. The system of claim 5 wherein the first quantity comprises about 72% of the energy, the second quantity comprises about 21% of the energy, and the third quantity comprises about 7% of the energy.

7. The system of claim 1 wherein the source comprises a first light emitter that provides the first quantity and a second light emitter that provides the second quantity.

8. The system of claim 1 wherein the detector simultaneously integrates a portion of the first quantity and a portion of the second quantity.

9. The system of claim 1 further comprising a print engine that prints on media in response to the signal.

10. The system of claim 1 further comprising a modem that provides data communication in response to the signal.

11. The system of claim 1 wherein the detector in providing the signal is substantially insensitive to a chromaticity of the image.

12. A circuit that controls a light source for illuminating an image and that provides a grayscale signal in response to the illumination of the image, the circuit comprising:
   a. a first driver that provides a first control signal to the light source for controlling a first quantity of energy of a first color per unit area of the image;
   b. a second driver that provides a second control signal to the light source for controlling a second quantity of energy of a second color per unit area of the image, wherein the first and the second quantities are each proportional to a respective quantity of corresponding color of a reference point, the reference point determined with reference to human vision;
   c. a timer that controls a provided integrating photosensor so that the photosensor provides an analog signal per pixel corresponding to an integration of the first quantity with the second quantity; and
   d. an analog to digital converter that provides the grayscale signal in response to the analog signal received from the integrating photosensor.

13. The circuit of claim 12 wherein the first color consists of a primary color.

14. The circuit of claim 12 wherein the first quantity comprises 70% to 80% of a total energy of the illumination.

15. The circuit of claim 12 wherein:
   a. the energy further comprises a third quantity of a third color;
   b. the first, second and third quantities are each proportional to a respective corresponding quantity of primary color of the reference point; and
   c. the timer further controls the integrating photosensor so that the photosensor provides the analog signal per pixel corresponding to an integration of the first quantity with the second quantity with the third quantity.

16. The circuit of claim 15 wherein the first quantity comprises about 72% of the energy, the second quantity comprises about 21% of the energy, and the third quantity comprises about 7% of the energy.

17. The system of claim 12 wherein:
   a. the first and second colors respectively comprise red and blue light;
   b. the first quantity includes from 10% to 40% of the energy; and
   c. the second quantity includes from 5% to 30% of the energy.

18. The circuit of claim 12 wherein the first control signal has a period proportional to the first quantity.

19. The circuit of claim 12 wherein the circuit in providing the grayscale signal is substantially insensitive to a chromaticity of the image.

20. The circuit of claim 12 wherein the grayscale signal is further provided in accordance with a lightness of the image.

21. A method for generating a monochrome image copy, the method comprising the steps of:

illuminating an object with a first light, the first light having a first predefined spectral power distribution;

sensing a portion of the first light with a sensor;

illuminating the object with a second light, the second light having a second predefined spectral power distribution different from the first predefined spectral power distribution;

sensing a portion of the second light with the sensor;

generating a signal corresponding to the combined sensed portion of the first light and the sensed portion of the second light; and     converting the generated signal into a monochrome signal corresponding to the sensed portion of the first light integrated with the sensed portion of the second light the monochrome signal configured to generate a monochrome image copy of the object.

22. The method of claim 21, whereby the step of sensing senses light reflected from the object.

23. The method of claim 21, whereby the step of sensing senses light transmitted through the object.

24. The method of claim 21, whereby the step of converting the generated signal further comprises the step of converting an indicia of luminous information into an indicia of lightness information, the indicia of lightness information devoid of chromaticity information.

25. The method of claim 21, whereby the step of converting further comprises the step of converting the generated signal to a grayscale signal.

26. The method of claim 21, further comprising the step of gamma correcting the generated signal.

27. The method of claim 21, further comprising the step generating a monochrome copy of the object using the generated monochrome signal.

28. The method of claim 21, further comprising the steps of:

illuminating the object with a third light, the third light having a third predefined spectral power distribution; and     sensing a portion of the third light with the sensor, corresponding to the third light such that the generated signal corresponds to the combined sensed portion of the first light, the sensed portion of the second light and the sensed portion of the third light.

29. The method of claim 28, whereby:

the step of illuminating the object with the first light further comprises the step of illuminating the object with a red light;

the step of illuminating the object with the second light further comprises the step of illuminating the object with a green light; and     the step of illuminating the object with the third light further comprises the step of illuminating the object with a blue light.

30. The method of claim 29, whereby:

the step of illuminating the object with the red light further comprises the step of generating the red light with an energy from 10% to 40% of a total energy of light illuminating the object;

the step of illuminating the object with the blue light further comprises the step of generating the blue light with an energy from 5% to 30% of the total energy of light illuminating the object; and     the step of illuminating the object with the green light further comprises the step of generating the green light with a percentage energy corresponding to the remaining total energy of light illuminating the object.

31. The method of claim 29, further comprising the step of turning off a selected one of the red light, the blue light and the green light, and again performing the steps of sensing, generating and converting.

32. The method of claim 28, further comprising the steps of:

color correcting the sensed portion of the first light such that the first predefined spectral power distribution corresponds to light of a red wavelength;

color correcting the sensed portion of the second light such that the second predefined spectral power distribution corresponds to light of a green wavelength; and     color correcting the sensed portion of the third light such that the third predefined spectral power distribution corresponds to light of a blue wavelength.

33. The method of claim 28, whereby:

the step of illuminating the object with the first light further comprises the step of illuminating the object with a red light, the red light having an energy from 20% to 30% of a total energy of light illuminating the object; and     the step of illuminating the object with the second light further comprises the step of illuminating the object with a green light, the green light having an energy from 70% to 80% of the total energy of light illuminating the object.

34. The method of claim 21, whereby:

the step of illuminating the object with the first light further comprises the step of illuminating the object with a blue light, the blue light having an energy from 20% to 30% of a total energy of light illuminating the object; and     the step of illuminating the object with the second light further comprises the step of illuminating the object with a green light, the green light having an energy from 70% to 80% of the total energy of light illuminating the object.

\* \* \* \* \*

UNITED STATES PATENT AND TRADEMARK OFFICE
CERTIFICATE OF CORRECTION

PATENT NO. : 6,542,259 B1                                    Page 1 of 1
DATED      : April 1, 2003
INVENTOR(S) : Andersen et al.

It is certified that error appears in the above-identified patent and that said Letters Patent is hereby corrected as shown below:

<u>Column 15,</u>
Line 22, delete "light" and insert thereof -- light, --.
Line 33, between "of" and "chromaticity", insert -- an indicia of --.

Signed and Sealed this

Twelfth Day of October, 2004

JON W. DUDAS
*Director of the United States Patent and Trademark Office*